(No Model.)
M. F. FIELD.
LOOM SHUTTLE.
No. 343,578. Patented June 15, 1886.
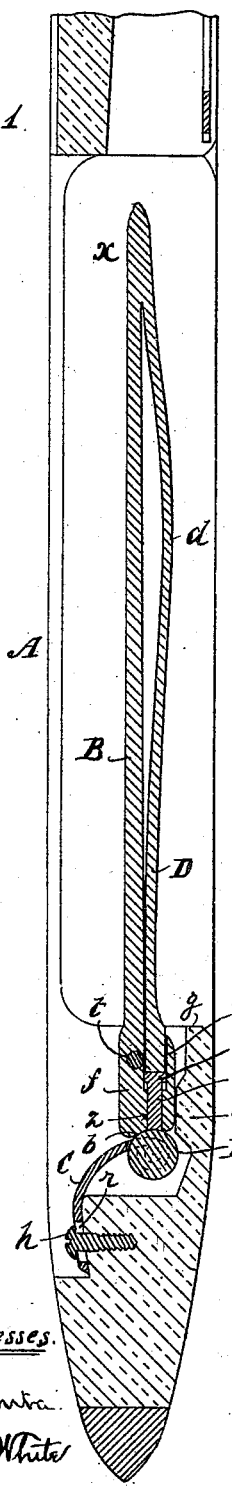
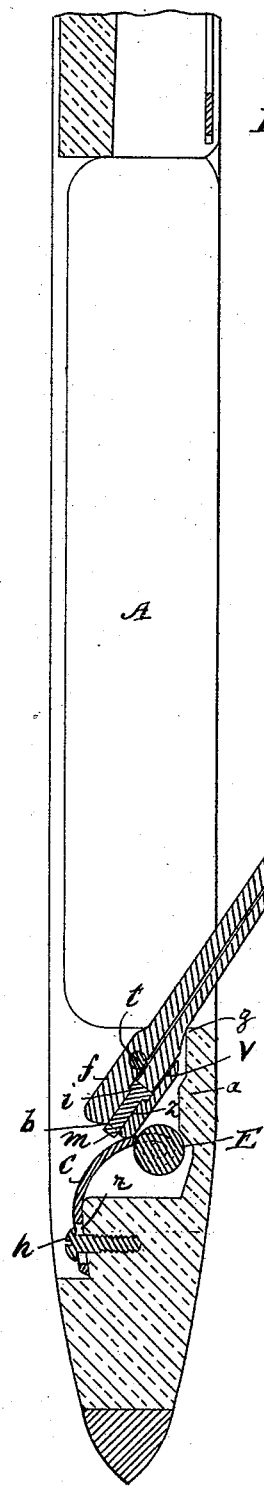
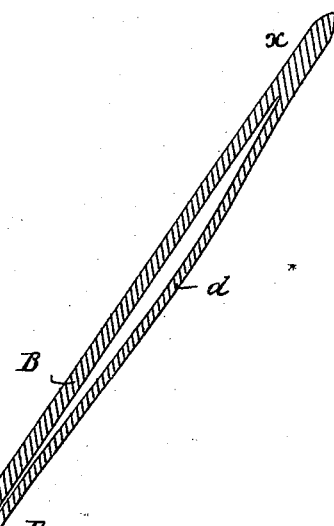
Witnesses:
Inventor.
Millard F. Field,
Per C. A. Shaw,
Attorney.

UNITED STATES PATENT OFFICE.

MILLARD F. FIELD, OF CHELSEA, ASSIGNOR, BY MESNE ASSIGNMENTS, TO THE AMERICAN SPINDLE COMPANY, OF BOSTON, MASSACHUSETTS.

LOOM-SHUTTLE.

SPECIFICATION forming part of Letters Patent No. 343,578, dated June 15, 1886.

Application filed June 15, 1885. Serial No. 168,753. (No model.)

*To all whom it may concern:*

Be it known that I, MILLARD F. FIELD, of Chelsea, in the county of Suffolk, State of Massachusetts, have invented a certain new and useful Improvement in Loom - Shuttles, of which the following is a description sufficiently full, clear, and exact to enable any person skilled in the art or science to which said invention appertains to make and use the same, reference being had to the accompanying drawings, forming part of this specification, in which—

Figure 1 is a vertical longitudial section of my improved shuttle, the spindle being represented as closed, expanded, and locked; and Fig. 2 a like view, the spindle being represented as opened, collapsed, and locked. In each of said views a portion of the body of the shuttle is represented as broken off.

Corresponding letters of reference indicate corresponding parts in the different figures of the drawings.

My invention relates to that class of loom-shuttles which are provided with means for securing the cop or bobbin on the spindle when the spindle is closed; and it consists in a novel construction and arrangement of the parts, as hereinafter more fully set forth and claimed, the object being to provide a simpler, cheaper, and more effective device of this character than is now in ordinary use.

The nature and operation of the improvement will be readily understood by all conversant with such matters from the following explanation, its extreme simplicity rendering an elaborate description unnecessary.

In the drawings, A represents the body of the shuttle; B, the spindle, and C the roller-spring. The spindle is pivoted at $t$ in the body A and provided on its upper side with the spring D, the outer end of said spring being welded to the spindle to form the point $x$, and the inner end fitted to work in a socket, $v$, in the shank $f$. A hole, $z$, less in diameter than the socket $v$, extends from the bottom of said socket through the end of the shank $f$, and fitted to work in said hole there is a push-pin, $m$, provided with a head, $i$, to prevent its escape from the hole, said head bearing upon the end of the spring D. A friction-roller, E, is journaled in the outer or free end of the spring C, said spring being curved upwardly, provided with a slot, $r$, and adjustably attached to the body of the shuttle by the screw $h$. The rear end of the shank $f$ of the spindle B is cut out or concaved, as shown at $b$, to receive the roller E when the spindle is closed. A stop or projection, $a$, is formed in the body of the shuttle, on which the shank $f$ rests when the spindle is closed, a shoulder, $g$, serving to stop the spindle when it is opened.

In the use of my improvement the spindle is opened, as shown in Fig. 2, to receive the cop or bobbin, thereby causing the roller E to pass out of or be removed from the cavity $b$ in the shank $f$, and permitting the spring D to straighten out and force the pin $m$ outwardly through the hole $z$ until its head $i$ rests on the bottom of the socket $v$. When the spring D straightens out, as described, its body $d$ approaches the spindle proper, B, or the spindle considered as a whole collapses, thereby enabling it to be inserted in the cop or bobbin. After the cop or bobbin has been placed on the spindle and properly adjusted, the spindle is closed or brought into parallelism with the body A, thereby causing the roller E to roll into the cavity $b$ in the end of the shank $f$, forcing the push-pin $m$ against the end of the spring D in the socket $v$, bending or bowing said spring, and securing the cop or bobbin on the spindle in a manner which will be readily obvious without a more explicit description.

It will also be obvious that when the spindle is closed, as described, it will be locked in that position by the roller E and spring C, the roller being forced into the cavity $b$ in the end of the shank $f$ by said spring; also, that when it is opened it will be locked by the spring C and roller E, the end of the shank $f$ resting on said roller or on the spring C near said roller, as shown in Fig. 2.

The spring C, being constructed with the slot $r$, may be adjusted on the screw $h$ to exert any desired degree of pressure on the spindle B.

I am aware that shuttle-spindles have heretofore been held in open or closed position by means of springs adapted to bear upon different faces of the shanks of the spindles, according as said spindles were in open or closed position, and have therefore made no broad claim to such feature.

I am also aware that a shuttle has been constructed in which the spindle was provided with a spring secured thereto at its outer end and its inner beveled end resting in a socket in the spindle-shank, a beveled-faced pin working in a hole in said shank at right angles to said socket, and adapted to bear upon the beveled end of said spring, and a spring for bearing upon the other end of said pin; but in the present invention the pin is in line with the spring of the spindle and provided with a head, to prevent its accidental displacement or loss.

Having thus explained my invention, what I claim is—

1. The shuttle-body A and the spindle B, pivoted therein, said spindle being provided with the socket $v$ in its shank, and the hole $z$ in line with said socket and extending through said shank, the spring D, having its outer end secured to said spindle and its inner end resting in said socket, and the push-pin $m$, having its inner end bearing against the end of said spring, and its body working in said hole, in combination with a spring having a roller adapted to bear against the outer end of said push-pin when the spindle is closed, substantially as described.

2. The shuttle-body A and the spindle B, pivoted therein, said spindle being provided with the socket $v$ in its shank, and the hole $z$ in line with but smaller than said socket, and extending through said shank, the spring D, having its outer end secured to said spindle and its inner end resting in said socket, and the headed push-pin $m$, having its head bearing against the end of said spring and its body working in said hole, in combination with a spring having a roller adapted to bear against the outer end of said push-pin when the spindle is closed, substantially as described.

3. The shuttle-body A, the spindle B, pivoted therein, said spindle being provided with the socket $v$ in its shank, with the hole $z$ in line with but smaller than said socket and extending through said shank, and with the cavity $b$ in the end of said shank, the spring D, having its outer end secured to said spindle and its inner end resting in said socket, and the headed push-pin $m$, having its head bearing against the end of said spring and its body working in said hole, in combination with the spring C, secured to said shuttle-body A and provided with a longitudinal slot in its body, the screw $h$, for rendering said spring adjustable longitudinally of the shuttle-body, and the roller E, pivoted in the free end of said spring, said roller being forced by said spring into the cavity $b$ and against said push-pin $m$ in the spindle-shank when the spindle is closed, substantially as described.

MILLARD F. FIELD.

Witnesses:
C. A. SHAW,
L. J. WHITE.